United States Patent Office 2,811,505
Patented Oct. 29, 1957

2,811,505

POLYMETHACRYLONITRILE COMPOSITION HEAT STABILIZED FOR INJECTION MOLDING

Roger M. Schulken, Jr., and John W. Tamblyn, Kingsport, Tenn., assignors to Eastman Kodak Company, Rochester, N. Y., a corporation of New Jersey No Drawing. Application April 8, 1954,
Serial No. 421,966

3 Claims. (Cl. 260—45.8)

The present invention relates to the stabilization of polymethacrylonitrile molding compositions. The invention is particularly concerned with novel compositions of polymethacrylonitrile containing small amounts of heat stabilizers.

The stabilization of polymethacrylonitrile during injection molding presents a unique problem. Polymethacrylonitrile has a relatively high softening temperature and it normally discolors badly at the temperature to which it is subjected during the molding process. For some reason there is a tendency for films of polymethacrylonitrile to adhere to and collect on the metallic surfaces of the extrusion equipment. These films are, due to their location, subjected to unusually high temperatures for unusually long periods of time whereupon they become badly degraded and carbonized. Carbonization results in blackening of the resin or portions thereof and renders it infusible. It represents the last stage of severe thermal degradation but occurs very rapidly after initial red discoloration of the polymethacrylonitrile because of an autocatalytic effect of the breakdown process. For this reason, breakdown of the resin in the adherent films on the metal surfaces catalyzes the thermal degradation of the entire resin mass and prevents further processing of the resin. In other words, the resin cannot be processed if carbonization takes place.

In the course of injection molding, a batch of polymethacrylonitrile containing inadequate stabilization components first exhibits a yellow color which gradually darkens to orange and then to red, finally turning black. As discoloration progresses, the resistance to flow increases and the resin sticks in the processing equipment.

The prior art is almost devoid of suggestions relating to the thermal stabilization of polymethacrylonitrile. A number of stabilizers recommended for the injection molding of vinyl chloride, cellulosics, and other resinous compounds were found ineffective in the stabilization of polymethacrylonitrile, and in many cases these stabilizers were found to be detrimental in that they actually accelerated breakdown and discoloration. Experience of prior workers in the stabilization of solutions of polyacrylonitrile was also of no value since the stabilization of the pure resin for the purpose of producing molded products is a different problem in two respects. First, no solvents are used, and second, the temperature range necessary for successful molding of the resin is higher than that to which the resin solutions ordinarily would be subjected. In many cases, materials which are stabilizers for acrylonitrile solutions are completely ineffective in the pure resin. Also good resin stabilizers are not generally good solution stabilizers.

Experimental work has shown that while some stabilizers are good in inhibiting thermal degradation of polymethacrylonitrile for a small time or for lower temperatures, these stabilizers have failed adequately to inhibit polymethacrylonitrile heated for longer periods at higher temperatures representative of the conditions to which portions of the resin invariably will be exposed in injection molding by commercial methods. Some stabilizers which otherwise have been found good are adversely affected by factors representative of different inherent stabilities of different batches of polymer. Experience with acrylonitrile is not particularly valuable since the polymethacrylonitrile contains the relatively bulky methyl group in alpha position which gives it a different character.

We now have found stabilizers which provide adequate inhibition for the processing of polymethacrylonitrile resins in commercial injection molding equipment.

The present invention therefore has as an object the stabilization of polymethacrylonitrile for injection molding and the elimination of thermal degradation and carbonization of the resin during injection molding. Another object of the invention is to provide a novel stabilized resinous composition which can be processed in commercial molding equipment. A further object is to provide a stabilized composition for long term heating and to provide stabilizers whose effectiveness is not limited to polymethacrylonitrile resins of certain character. Another object is to provide a method for the injection molding of polymethacrylonitrile.

The objects of the invention are accomplished by the addition to polymethacrylonitrile of a stabilizing amount of 1,4-bis(2,3-epoxypropoxy) benzene or 1,3-bis(2,3-epoxypropoxy) benzene. In accordance with the invention a polymethacrylonitrile molding composition stabilized against heat degradation and carbonization at molding temperatures comprises at least 70% by weight of polymethacrylonitrile and from 0.5 to 10% by weight of 1,4-bis(2,3-epoxypropoxy) benzene (i. e. hydroquinone bisglycidyl ether) or from 0.5 to 10% by weight of 1,3-bis(2,3-epoxypropoxy) benzene (i. e. resorcinol bisglycidyl ether).

We have found that it is possible to injection mold polymethacrylonitrile containing hydroquinone bisglycidyl ether or resorcinol bisglycidyl ether without carbonization of the resin although epichlorohydrin, glycidyl phenyl ether, and commercial stabilizers containing 8% epoxy did not prevent carbonization. These inhibitors must be carefully refined to remove all traces of phenolic materials. Resin compositions containing 3% of the inhibitors of the invention may be molded continuously for over an hour without exhibiting a difference in color between the first and last pieces molded. While other stabilizers containing epoxy groups sometimes initially indicate highly efficient elimination of degradation, these compounds, by contrast with the stabilizers of the invention, allow carbonization over the longer periods and at the higher temperatures. By way of further contrast, the stabilizers of the invention can be used in greater concentrations without the appearance of any deleterious effects.

A relatively stable sample of polymeric methacrylonitrile stabilized with 3% of 1,4-bis(2,3-epoxypropoxy) benzene had a heat stability superior to many cellulose esters—an improvement of about 75° C. in the degradation temperature of the polymer. As pointed out above, however, it should be noted that whereas the compounds of the invention provide a much longer period of stabilization than do certain other stabilizer compounds and therefore make injection molding possible, the stabilizers of the invention are not as effective as certain other compounds in the early stages of heating, and as will be noted from the examples, actually seem to accelerate the formation of a light yellow color in the resin at a relatively low temperature. Also, while certain phases of stabilization with the new stabilizer are considerably improved by combining certain other stabilizing substances in the resin, the length of the period of stabilization afforded by the combination always has been found inferior to that obtained with the use of the substances of this invention alone.

The stabilizers of the invention are effective when employed in a concentration within the range of 0.5 to 10% by weight. Stability of the resin is improved markedly by increases from 0.5 to 4% and then less rapidly until only slight improvement normally appears in going from 7% to 10%. The most advantageous concentration appears to be at about 3%.

We have found that the resin is carbonized more rapidly in the presence of certain types of metal, and for the practice of the invention equipment should be used in which highly heated resin will not be exposed to brass or iron. As will be seen from the following examples the invention provides a material that can be incorporated in polymethacrylonitrile and that can increase the stability of the resin to heat enough to make possible the production of molded objects which are not discolored appreciably during molding processes. Thus, the invention is concerned specifically with a long-range stabilizer intended to overcome the problems which occur through the adherence of the resin to metals in the processing equipment, with the result that the film of resin is subjected to longer heating periods, which would cause considerable breakdown and breakdown products would accelerate breakdown of surrounding resin. The invention is illustrated in the following examples.

EXAMPLE 1

Ten-gram samples of a carefully prepared and isolated polymer of methacrylonitrile in powder form were mixed with each of the following stabilizers in the concentrations noted. The powder of each sample was pressed between heated chrome-plated platens to a clear colorless sheet 0.050 inch thick. Portions of these sheets were heated uniformly for one hour at 225° C.

EFFECT OF STABILIZERS ON HEATING OF POLYMETHACRYLONITRILE

| Stabilizer | Concentration, Percent | Color of Heated Specimen |
|---|---|---|
| 1. None (blank) | | Black. |
| 2. Chlorohydroquinone bis-glycidyl ether | 2 | Yellow. |
| 3. Glycidyl phenyl ether | 3 | Do. |
| 4. Glycidyl allyl ether | 3 | Do. |
| 5. Advance Stabilizer CL-547 (Epoxy 8%, composition unknown) | 3 | Do. |
| 6. Hydroquinone bisglycidyl ether | 3 | Light Yellow. |

EXAMPLE 2

Samples of a copolymer of methacrylonitrile and alpha-methyl styrene (70-30) were treated and tested as described in Example 1. About the same results were noted except the blank had a somewhat greater stability.

EXAMPLE 3

A 100-g. sample of polymethacrylonitrile was stabilized with 3 g. of hydroquinone bisglycidyl ether and injection-molded to produce a clear, light yellow specimen. A similar unstabilized sample turned black and burned in the injection cylinder producing an unmoldable material. The molding temperature was 200° C.–240° C.

EXAMPLE 4

Stability tests were carried out by dissolving various stabilizers in methanol, which is not a solvent for the polymer, then mixing the stabilizer solutions into 20-mesh polymethacrylonitrile powder. The powder was used to avoid any large lumps which might not absorb the stabilizer evenly. Mixture of the stabilizer solution with the polymer was obtained by stirring the former into the polymer sample with a stirring rod and thoroughly mixing the composition by tumbling it in a 10 g. sample bottle over night. A control sample was prepared by adding pure methanol to the polymer and treating it in the same way. The mixture was dried to remove methanol, pressed into 0.050 inch plates, cut into 1.0 x 0.5 inch strips, and the strips heated in air-tight glass sandwiches under controlled conditions. The samples were photographed in color at 20–30 minute intervals during the heating period. In Table II results are indicated on the basis of the depth of color in each sample according to an arbitrary color scale as follows:

Table I

| Color of sample: | Rating |
|---|---|
| Colorless | 0 |
| Very light yellow | 1 |
| Light yellow | 2 |
| Yellow | 3 |
| Orange | 4 |
| Red | 5 |
| Dark red | 6 |
| Very dark red | 7 |
| Black | 8 |

As a general rule, the first point of comparison used was when the unstabilized sample was light yellow or had a rating of 2; the second when it was red, i. e. 5; and the third just before the sample stabilized with 3% 1,4-bis(2,3-epoxypropoxy) benzene changed from yellow to orange.

Table II

| Stabilizer | Color of Heated Sample | | |
|---|---|---|---|
| | 30 Min., 135–180° C. | 80 Min., 135–220° C. | 160 Min., 135–230° C. |
| None | 2 | 5 | 8 |
| 1,2,3-Tribromopropane | 0 | 3 | 7 |
| p-Bis(2,3-epoxypropoxy) benzene | 3 | 3 | 3 |
| m-Bis(2,3-epoxypropoxy) benzene | 3 | 3 | 3 |

EXAMPLE 5

Using samples as prepared in Example 4 and the same color scale rating, a heat test was performed in which were included representative samples of the stabilized and unstabilized polymer. Results were as follows:

Table III

EFFECT OF EPOXY COMPOUNDS ON STABILITY

| Compound | Concentration, Percent | Color of Heated Sample | | |
|---|---|---|---|---|
| | | 30 Min., 135–180° C. | 80 Min., 135–220° C. | 160 Min., 135–230° C. |
| None (blank) | | | 2 | 5 | 8 |
| 1,2-Epoxy-3-isopropoxy propane | 1 | | 5 | 8 |
| 2,3-Epoxypropyl α-methyl-glycidate | 3 | 3 | 5 | 5 |
| 1,2-Epoxy-3-isopropoxy-propane | 1 | | 6 | |
| m-Bis (2,3-epoxypropoxy) benzene | 3 | 3 | 3 | 3 |
| p-Bis (2,3-epoxypropoxy) benzene | 3 | 3 | 3 | 3 |
| 2-Chloro-1,4-bis (2,3-epoxypropoxy) benzene | 3 | 2 | 3 | 7 |
| 1,4-Bis (2,3-epoxypropoxy)-2-octylbenzene | 3 | 2 | 4 | 7 |
| 4-(2,3-Epoxypropoxy)-2-(1,1,3,3-tetramethylbutyl) phenol | 1 | 2 | 4 | 8 |
| 2,3-Epoxypropyl lactate | 3 | 2 | 2 | 8 |
| (1,2-Epoxyethyl) benzene | 1 | | 4 | 7 |

The above samples were made up as in Example 4 and were placed on a metal sheet covered by a glass plate in an oven which had been heated to a starting temperature of 135° C. Heating was continued at such a rate that a temperature of 180° C. was attained in 30 minutes, 220° C. in 80 minutes, and 230° C. in 160 minutes, as shown.

EXAMPLE 6

A 100-g. sample of polymethacrylonitrile was stabilized with 3 g. of resorcinol bisglycidyl ether and injection-molded to produce a clear, light yellow specimen. A similar unstabilized sample turned black and burned in the injection cylinder producing an unmoldable material. The molding temperature was 200° C.–240° C.

EXAMPLE 7

A 100-g. sample of polymethacrylonitrile was plasticized with 10 g. of dibutyl sulfone, stabilized with 3 g. of hydroquinone bisglycidyl ether, and injection molded to produce a clear, light yellow specimen even after one hour of continuous molding. A similar unstabilized sample turned black and burned in the injection cylinder within 10 minutes, producing an unmoldable material. The molding temperature was approximately 200° C.

Any of the conventional methods for dispersing the stabilizer can be used for the purpose of our invention, but the method described above in Example 4 is preferred. Alternately, for example, the stabilizer could be formed into a paste with plasticizer and mixed into the resin, or it could be added to the polymer and mixed on heated compounding rolls.

Plasticizers which might be employed if desired include dibutyl sulfone, ditolyl sulfone, dimethyl phthalate, dibutyl phthalate, and dibutyl sebacate.

We claim:

1. An improved injection molding composition consisting essentially of homopolymericmethacrylonitrile and 0.5 to 10%, by weight, of a stabilizer for employment in injection molding equipment wherein said composition is exposed to contact at an elevated temperature of from about 200° C. to about 240° C. to the heated metallic surfaces of said injection molding equipment, said surfaces being other than brass or iron, said stabilizer being selected from the group consisting of 1,4-bis(2,3-epoxypropoxy)benzene and 1,3 - bis(2,3 - epoxypropoxy)benzene, whereby the polymethacrylonitrile composition can be continuously processed at said elevated temperature in said injection molding equipment for about 1 hour without deleterious carbonization on the metallic surfaces of said equipment.

2. The improved composition as defined in claim 1 wherein the stabilizer is 1,4-bis(2,3-epoxypropoxy)benzene.

3. The improved composition as defined in claim 1 wherein the stabilizer is 1,3-bis(2,3-epoxypropoxy)benzene.

References Cited in the file of this patent

UNITED STATES PATENTS

| | | |
|---|---|---|
| 2,208,216 | Johnson et al. | July 16, 1950 |

FOREIGN PATENTS

| | | |
|---|---|---|
| 66,626 | Netherlands | Nov. 15, 1950 |